May 3, 1949.  R. L. BURCHETT  2,468,810
PYROPHORIC LIGHTER
Filed Jan. 23, 1947
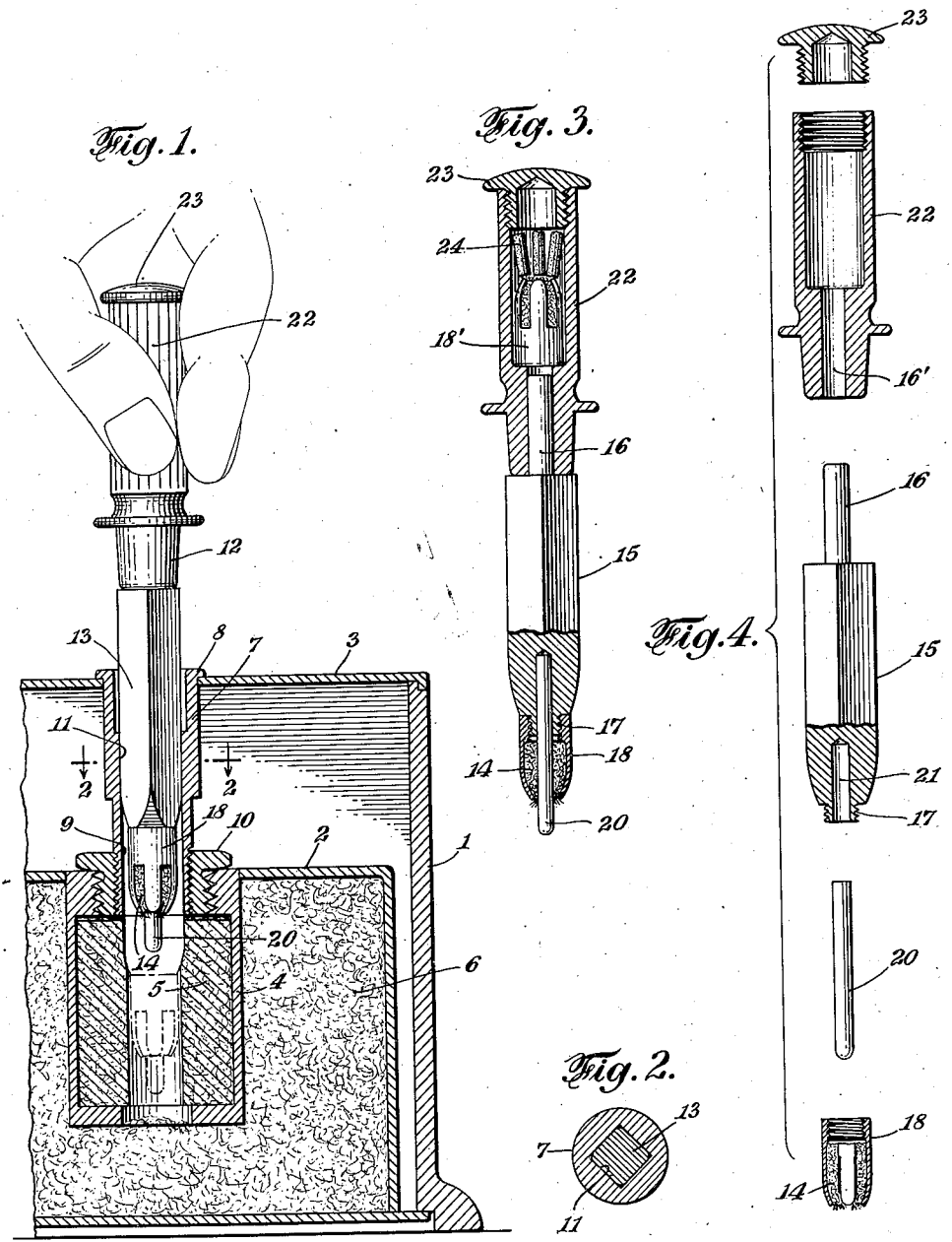
INVENTOR
Ray L. Burchett.
BY Ward Crosby & Neal
his ATTORNEYS Patented May 3, 1949

2,468,810

UNITED STATES PATENT OFFICE 2,468,810

PYROPHORIC LIGHTER

Ray L. Burchett, East Orange, N. J., assignor to Ronson Art Metal Works, Inc., Newark, N. J., a corporation of New Jersey Application January 23, 1947, Serial No. 723,736

2 Claims. (Cl. 67—4.1)

This invention relates to pyrophoric lighters of the type having a removable torch.

The invention relates more particularly to a novel form of torch and the combination therewith of other parts of the lighter engaged thereby. Objects of the invention are to facilitate assembly and disassembly when desired, and to prevent inadvertent damage during operation of the lighter. These and other objects, advantages and features of the invention will be better understood from the following detailed description taken in connection with the accompanying drawings, in which—

Fig. 1 is a side elevation, in section, showing the pertinent parts of a lighter embodying the invention;

Fig. 2 is a cross-sectional view taken at line 2—2 of Fig. 1;

Fig. 3 is a side elevation, partly in section, showing further details of the torch per se; and Fig. 4 is an exploded view of the torch shown in Fig. 3.

Referring more particularly to Fig. 1: a lighter case is shown as 1, containing a body or tank 2 and provided with a cover plate 3. The tank 2 comprises a cage 4 serving to hold a tubular absorbent felt wick 5 in operative position to receive fuel from relatively loose absorbent material such as 6, disposed within the tank 2, and transfer it to the wick end of a removable torch. So far, the elements and arrangement is in general common to devices of the prior art. It is well known that in such devices the tubular felt or the like wick 5 is snugly engaged interiorly by the torch wick-tip, and since these tips are secured to the torch by screw threads to provide for ready replacement, trouble has been experienced by accidental detachment of the wick-tips, due to inadvertent rotation of the torch while the tip is engaged within the wick. This often requires the entire lighter to be returned to the factory for repairs.

According to this invention I have overcome this difficulty and have provided other advantages and improvements by the construction and arrangement to be referred to more fully hereinafter.

A sleeve 7, provided with a flanged head 8 and a threaded inner end 9, is passed through an opening in the cover 3 with the head 8 engaging the cover and the inner end in threaded engagement within a bushing 10 suitably rigidly secured to the tank 2 in aligned axial register with the felt wick 5, thus providing a means for securing the tank or body 2, casing 1 and cover plate 3 in assembled position. A portion of the bore of bushing 7, such as at 11, is non-circular in cross-section, in the present embodiment square (Fig. 2). A torch designated in general as 12 is provided with a shank portion, such as 13, having a non-circular cross-section complementary to the sleeve bore at 11; the stem 13 thus being freely slidably movable axially of the sleeve 7 but being restrained against angular movement relative to said sleeve 7. Thus in the (solid line) position shown in Fig. 1 the torch 12 is adapted to be used as a tool or key for rotating the sleeve to screw the same inwardly in assembling or disassembling the parts, thus avoiding the need for extending the flange 8 upwardly a sufficient distance to be engaged.

Further, when the torch is moved to its innermost (broken line) position where the torch wick tip 14 is snugly disposed within the felt wick 5 the non-circular cooperating portions of the torch and sleeve prevent inadvertent rotation of the torch and hence obviate the accidental removal of the tip from the torch and its displacement in the lower end of the wick 5 or cage 4.

The torch 12 in its preferred form comprises a main body portion 15 of non-circular cross-section conforming to the cross-section of the shank portion 13 (Figs. 3 and 4) which permits the body to be made of square, or other non-circular, bar stock. One end of the body 15 is turned down or otherwise suitably provided with a dowel-pin end 16, and the other end is provided with a threaded portion 17 for receiving in the usual manner a wick tip 18 in which is disposed the usual wick 14. A contact pin 20 of heat resistant metal is securely fastened in the lower end of stem 15, as by a press fit in bore 21, and passes outwardly beyond the tip 18. A cylindrical handle portion 22 is provided with a bore 16' into which the dowel pin 16 is tightly fitted to secure the parts together. The handle 22 is hollow and is provided with a screw cap 23 to provide a receptacle for holding a spare tip 18' and spare pieces of pyrophoric metal 24, so that these spare parts will be readily available. Such construction provides for ready manufacture and permits of a desired selection of materials suitable for the several parts of the torch 12.

Having thus described my invention with particularity with reference to a preferred embodiment thereof, and having referred to certain modifications, it will be obvious to those skilled in the art, after understanding my invention, that other changes and modifications may be made therein without departing from the spirit and scope of

What I claim is:

1. In a pyrophoric lighter of the character described having a body providing a fuel reservoir containing absorbent material adapted to receive a movable torch which has a removable wick tip engageable with said absorbent material, the combination with said body of a torch provided with a removable wick tip threadingly engaged thereon, a sleeve detachably secured to said body and providing a passage for receiving and guiding said torch tip into proper register within said absorbent material, said sleeve and torch being provided with cooperating non-circular cross-sectional portions so constructed and arranged that said torch is slidably movable in an axial direction and restrained against angular movement with respect to said absorbent material.

2. In a pyrophoric lighter of the character described having a body portion providing a fuel reservoir containing absorbent material adapted to receive a movable torch and also having a casing detachable from said body, the combination with said body portion of a torch, a sleeve for receiving and aligning said torch tip into register within said absorbent material, said sleeve serving as a means of holding said body and casing member together and threadingly engaging said body member, said sleeve and torch being provided with cooperating non-circular cross-sectional portions so constructed and arranged that said torch is slidably movable in an axial direction and upon forceful rotation angularly rotates said sleeve to releasing or holding position.

RAY L. BURCHETT.

REFERENCES CITED

The following references are of record in the file of this patent:

UNITED STATES PATENTS

| Number | Name | Date |
|---|---|---|
| 1,057,585 | Schlick | Apr. 1, 1913 |
| 1,088,271 | Ganz | Feb. 24, 1914 |

FOREIGN PATENTS

| Number | Country | Date |
|---|---|---|
| 408,149 | Great Britain | Apr. 5, 1934 |
| 445,805 | France | Sept. 13, 1912 |
| 478,458 | Great Britain | Jan. 19, 1938 |